(12) United States Patent
Huynh et al.

(10) Patent No.: US 11,567,778 B2
(45) Date of Patent: Jan. 31, 2023

(54) NEURAL NETWORK OPERATION REORDERING FOR PARALLEL EXECUTION

(71) Applicant: Amazon Technologies, Inc., Seattle, WA (US)

(72) Inventors: Jeffrey T. Huynh, San Jose, CA (US); Drazen Borkovic, Los Altos, CA (US); Jindrich Zejda, Saratoga, CA (US); Randy Renfu Huang, Morgan Hill, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 17/243,415

(22) Filed: Apr. 28, 2021

(65) Prior Publication Data
US 2021/0247984 A1    Aug. 12, 2021

Related U.S. Application Data

(63) Continuation of application No. 16/453,478, filed on Jun. 26, 2019, now Pat. No. 11,016,775.

(51) Int. Cl.
*G06F 9/44*      (2018.01)
*G06F 9/38*      (2018.01)
(Continued)

(52) U.S. Cl.
CPC .......... *G06F 9/3855* (2013.01); *G06F 9/5016* (2013.01); *G06F 9/5027* (2013.01); *G06N 3/04* (2013.01); *G06N 3/08* (2013.01)

(58) Field of Classification Search
CPC .... G06F 9/3855; G06F 9/5016; G06F 9/5027; G06N 3/04; G06N 3/08
See application file for complete search history.

(56) References Cited

U.S. PATENT DOCUMENTS 4,965,724 A  10/1990 Utsumi et al.
7,506,331 B2  3/2009 Archambault et al.
(Continued)

FOREIGN PATENT DOCUMENTS

EP    3399418      11/2018
WO   2017095840    6/2017
WO   2019095873    5/2019

OTHER PUBLICATIONS

U.S. Appl. No. 16/453,478, Non-Final Office Action, dated Oct. 30, 2020, 7 pages.
(Continued)

*Primary Examiner* — Cheng Yuan Tseng
(74) *Attorney, Agent, or Firm* — Kilpatrick Townsend & Stockton LLP

(57) ABSTRACT

Techniques are disclosed for reordering operations of a neural network to improve runtime efficiency. In some examples, a compiler receives a description of the neural network comprising a plurality of operations. The compiler may determine which execution engine of a plurality of execution engines is to perform each of the plurality of operations. The compiler may determine an order of performance associated with the plurality of operations. The compiler may identify a runtime inefficiency based on the order of performance and a hardware usage for each of the plurality of operations. An operation may be reordered to reduce the runtime inefficiency. Instructions may be compiled based on the plurality of operations, which include the reordered operation.

20 Claims, 11 Drawing Sheets

(51) Int. Cl.
*G06F 9/50* (2006.01)
*G06N 3/04* (2006.01)
*G06N 3/08* (2006.01)

(56) References Cited

U.S. PATENT DOCUMENTS

| | | | |
|---|---|---|---|
| 9,019,292 B2* | 4/2015 | Bloomfield | G06F 13/14 |
| | | | 345/538 |
| 10,761,851 B2 | 9/2020 | Han et al. | |
| 11,016,775 B2* | 5/2021 | Huynh | G06F 9/3855 |
| 2005/0108687 A1* | 5/2005 | Mountain | G06F 8/443 |
| | | | 717/127 |
| 2022/0066760 A1* | 3/2022 | Chang | G06F 9/5027 |

OTHER PUBLICATIONS

U.S. Appl. No. 16/453,478, Notice of Allowance, dated Feb. 4, 2021, 7 pages.
Ambrosi et al., "Hardware-Software Co-Design for an Analog-Digital Accelerator for Machine Learning", International Conference on Rebooting Computing (ICRC), Nov. 7, 2018, pp. 1-13.
Bae et al., "Auto-Tuning CNNs for Coarse-Grained Reconfigurable Array-Based Accelerators", IEEE Transactions on Computer Aided Design of Integrated Circuits and Systems, vol. 37, No. 11, Nov. 1, 2018, pp. 2301-2310.
Application No. PCT/US2020/037317, International Search Report and Written Opinion, dated Sep. 18, 2020, 12 pages.

* cited by examiner

NEURAL NETWORK OPERATION REORDERING FOR PARALLEL EXECUTION

CROSS REFERENCE TO RELATED APPLICATIONS

This application claims priority to and is a Continuation of U.S. application Ser. No. 16/453,478, filed on Jun. 26, 2019, and titled "NEURAL NETWORK OPERATION REORDERING FOR PARALLEL EXECUTION", the contents of which are herein incorporated in its entirety.

BACKGROUND

Artificial intelligence is an area of research and engineering that seeks to build intelligent machines that can make decisions in the same way that humans do. Artificial neural networks (which will be referred to herein as neural networks) fall within a sub-field of artificial intelligence called machine learning. Machine learning is a field of study that investigates giving computers the ability to learn without being explicitly programmed. A program that implements a machine learning algorithm is able to learn to do tasks without the program needing to include code that accounts for every possibility, and code that describes all possible behaviors.

The architecture of a neural network can include multiple operations. The operations can form different layers, including an input layer, an output layer, and a number of intermediate layers, often referred to as hidden layers. Each layer executes computations on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a Central Processing Unit (CPU) to perform the computations. CPUs, however, tend to be optimized for sequential rather than parallel computations, and thus can suffer from poor response times. Graphics Processing Units (GPUs) are optimized for parallel computations, but not necessarily for the result from one computation unit to be provided directly to another computation unit. Often, the result must first be written to a memory and then read back. Although GPUs can have better response times than CPUs, it would still be desirable to improve the execution time of a neural network.

BRIEF DESCRIPTION OF THE DRAWINGS

Various embodiments in accordance with the present disclosure will be described with reference to the drawings, in which.

DETAILED DESCRIPTION

Figure 1:
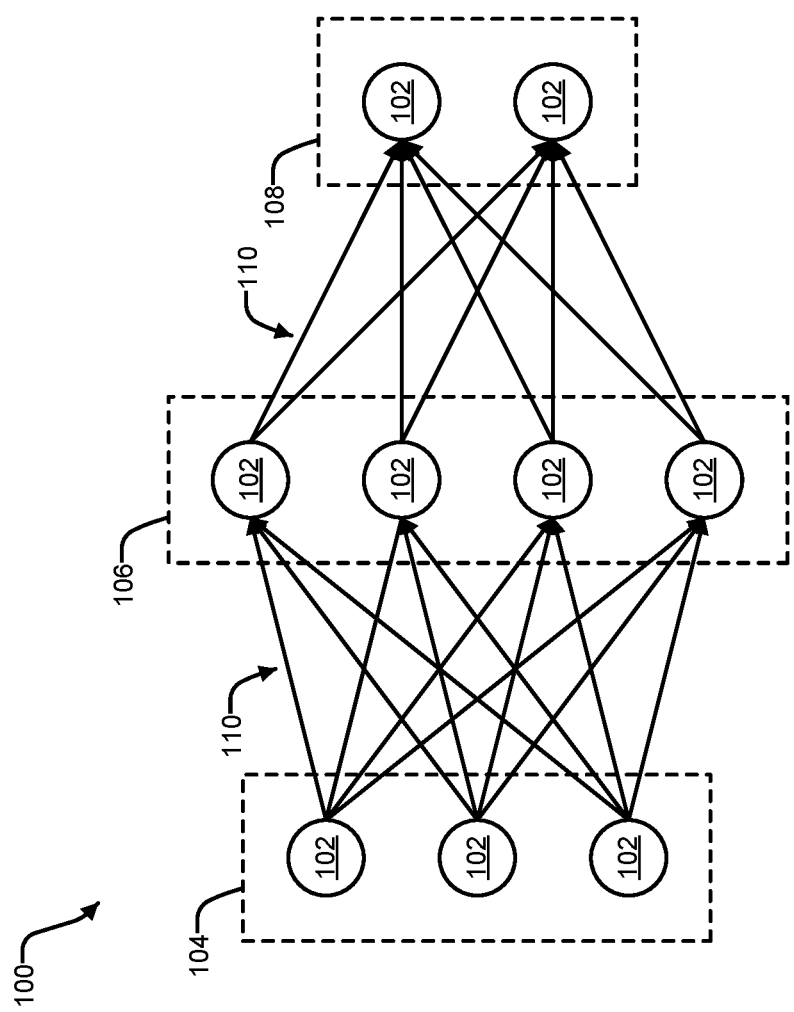
FIG. 1 illustrates an example of a visual model for a neural network.

Although ordinary "off-the-shelf" processors are often used to execute neural networks, special-purpose integrated circuit devices can be designed to execute neural networks at a significantly higher efficiency than these processors. Such devices (which can be referred to as neural network processors) can have unique hardware features that allow the most-encountered operations of a neural network to be performed seamlessly, often in parallel with other operations of the neural network. For example, a neural network processor can include one execution engine that can perform convolutions with high efficiency and another execution engine that can perform additions with high efficiency. The different execution engines can be utilized in a way such that different sets of data can be pipelined through the engines without either being idle.

Despite the efficiencies achieved by neural network processors, often the operations of a neural network are ordered in a way that the processors cannot achieve their full potential. For example, neural networks can be defined in a way such that operations are not fed evenly into the processor's different execution engines, causing certain execution engines to become overburdened while others sit idle. Because the order of operations is often important, one execution engine can be forced to wait while another execution engine first processes a set of data operated on by both execution engines. Preferably, one engine finishes execution of one operation and passes the result to the next engine, while continuing to process the next operation.

Examples described herein overcome the above-noted inefficiencies of neural network processors caused by sub-optimal operation ordering. Some examples provide for operation reordering during the compilation process. The compiler receives a description of a neural network and identifies a runtime inefficiency based on the current ordering of the neural network operations and the architecture of the neural network processor. The runtime inefficiency may be a sequence of operations where two operations are performed by the same execution engine immediately before and after an operation is performed by a different execution engine. Another runtime inefficiency may be two different branches of operations performed in an order that consumes more memory than needed. Different types of runtime inefficiencies may be stored in a host system and may be retrievable by the compiler.

Upon identifying a runtime inefficiency, the compiler may reorder one or more of the operations. For example, the programming code of a neural network may provide for a first operation to be followed by a second operation. In some scenarios, there can be one or more intervening operations between the first and second operations. The compiler may reorder the operations by moving the first operation such that the first operation is performed after the second operation and any intervening operations (if any). As another example, the compiler may reorder the operations by moving the second operation such that the second operation is performed before the first operation and any intervening operations (if any). The compiler may reorder single operations or blocks of operations (each block having a single or multiple operations). For example, blocks of operations may be reordered to improve memory reuse in the neural network processor by identifying groups of operations that write to the same amount of memory.

In some examples, the compiler may first determine whether two operations are reorderable prior to reordering them. In some instances, the two operations (as well as the operations between them) may perform a mathematical operation that is commutative (e.g., addition). In some examples, one or both of the operations may be modified when they are reordered to compensate for the new position of each operation. For example, an operation that adds four inputs may be modified to add only three inputs based on the operation's new position.

In some examples, the compiler may combine two operations that are adjacent to each other (one operates on the output data of the other) and are performed by the same execution engine. The compiler may first determine whether the two operations are combinable by determining whether the operations are similar and/or whether the two operations perform a mathematical operation that is commutative. Operations may be combined prior to or after reordering. For example, as a result of reordering, two adjacent operations may be combined such that they may be performed in the same number of cycles as either operation alone.

Examples described herein may be particularly advantageous to neural network processors having particular architectures, such as at least three execution engines that read/write to at least two memory devices. Specifically, one example neural network processor architecture may include a processing engine array that can perform high-bandwidth reads to a memory subsystem and high-bandwidth writes to a results buffer. Additionally, an activation engine and a pooling engine may perform reads or writes to either the memory subsystem or the results buffer. Such an architecture reduces latency while benefiting from operation reordering.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computational flow model 100 for a neural network. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right)$$

where $W_{ij}$ is a weight, $x_i$ is an input activation, $y_j$ is an output activation, $f(\ )$ is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can a propose an action that should be taken, etc. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Neural networks have been used for a variety of applications, including, for example, in the areas of image and video, speech and language, medicine, game play, and robotics. In image and video, neural networks have been used for image classification, object localization and detection, image segmentation, and action recognition. In speech and language, neural networks have been used for speech recognition, machine translation, natural language processing, and audio generation. In the medical field, neural networks have been used in genomics and medical imaging. In game play, neural networks have been used to play video and board games, including games with immense numbers of possible moves, such as Go or StarCraft. In robotics, neural networks have been used for motion planning of a robot, visual navigation, control stabilization, and driving strategies for autonomous vehicles.

Figure 2:
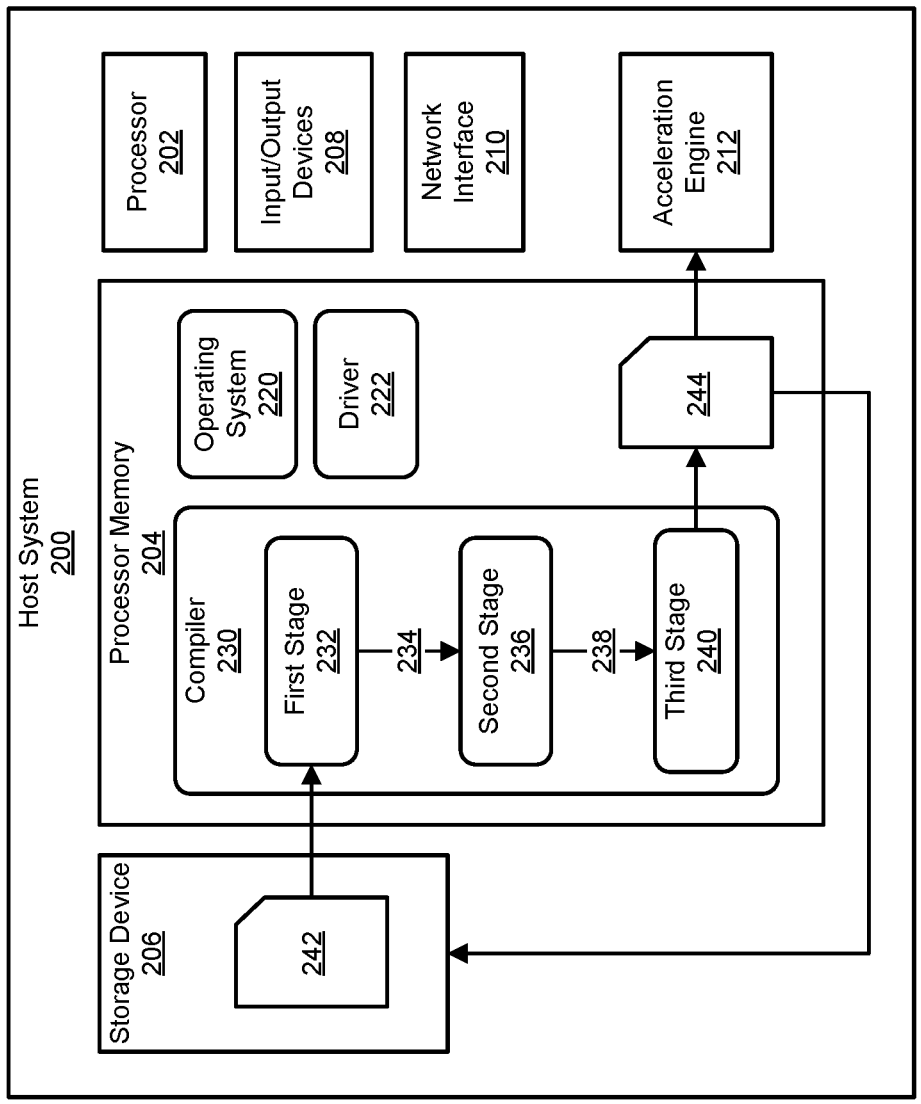
FIG. 2 includes a block diagram illustrating an example of a host system on which a compiler can run.

FIG. 2 includes a block diagram illustrating an example of a host system 200 on which a compiler 230, such as is described herein, can run. The illustrated host system 200 is an example of a computing device, and includes a processor 202, a processor memory 204, at least one storage device 206, various Input/Output (I/O) devices 208, and at least one network interface 210. In the example of FIG. 2, the host system 200 also includes an acceleration engine 212, which is an integrated circuit device that can accelerate certain operations or computations performed by the host system 200. In various examples, the host system 200 can be implemented as a server in a data center, a desktop computer, a laptop computer, a tablet computer, or a smartphone, among other examples. In some examples, operations or components discussed below as performed or included in the host system 200 can be performed or included in other computer devices. For example, the compiler 230 can execute on the host system 200 while the acceleration engine 212 is located at a different host system.

The processor 202 is an integrated circuit device that can execute program code, in the form of instructions. The program code can be used for various software applications or tools, such as an operating system 220 or the compiler 230. While the processor 202 is executing a program, the instructions for the program can be stored in the processor memory 204. The instructions can also be stored elsewhere, such as on the storage device 206, and can be loaded into the processor memory 204 when needed by the processor 202. The processor 202 can also use the processor memory 204 for temporary storage of other data on which the processor 202 is operating. In various examples, the processor memory 204 is a volatile memory type, such as a type of Random Access Memory, though non-volatile memory types can, alternatively or additionally, be used for the processor memory 204.

The storage device 206 is an example of a device that can include non-volatile memory. For example, the storage device 206 can be a magnetic disk drive, a solid state drive, or an optical drive, among other examples. The storage device 206 can further be non-transitory, such that program code and other data stored on the storage device 206 remains present when the storage device 206 is not powered on.

The storage device 206 is one example of a peripheral device, which are components that can be coupled to the host system 200 to add functionality to the host system 200. Other examples of peripheral devices include the Input/Output devices 208 and the network interface 210. The Input/Output devices 208 can include user input and output devices, such as keyboards, mice, touch screens, microphones, display screens, speakers, printers, and scanners, among other examples. The network interface 210, which can be implemented using a network interface card, can provide access to one or more networks. The network interface 210 can include, for example, a physical port for connecting a network cable and/or wireless antennas for communicating with Wi-Fi and/or cellular networks. The network interface 210 can also be described as an I/O device.

The acceleration engine 212 is also another type of peripheral device or I/O device. The acceleration engine 212 is a device that is purpose built to perform certain operations that can be performed by the processor 202, but can be performed faster by the acceleration engine 212. For example, the acceleration engine 212 can be a neural network accelerator, and, as such, may be able to perform the large scale, parallel computations of a neural network more efficiently than when the computations are performed by the processor 202. As another example, the acceleration engine 212 can be a graphics processing unit (GPU), and may be optimized to perform the computations needed for graphics rendering. Other examples of devices that can be implemented by the acceleration engine 212 include cryptographic accelerators, compression and decompression accelerators, 3-D accelerators, regular expression accelerators, security accelerators, and others.

In various examples, the acceleration engine 212 can execute program code to perform certain operations. For example, when the acceleration engine 212 is a neural network accelerator, the acceleration engine 212 can be programmed to execute a particular neural network, such as one that performs image recognition or one that performs machine translation. As a further example, to support the execution of a neural network, the acceleration engine 212 can be programed to perform operations such as copying data for the neural network from processor memory 204 (for example) into the acceleration engine 212, copying input data for the neural network from processor memory 204 into the acceleration engine 212, and/or copying results from the acceleration engine 212 into the processor memory 204, among other examples.

To generate program code for the acceleration engine 212, in various examples, the host system 200 can execute the compiler 230. Compilers, in general, are software programs that translate program code written in a human-readable language into a format (e.g., machine instructions) that can be read and processed by an integrated circuit device. In the example of FIG. 2, the acceleration engine 212 is a neural network accelerator and the compiler 230 is for compiling a neural network description into instructions to be executed on the acceleration engine 212. When the acceleration engine 212 implements a different type of accelerator, another compiler can be used.

The compiler 230 can be activated, for example, when the operating system 220 receives keyboard, mouse, touch-screen, voice commands, or other inputs from the Input/Output devices 208. The inputs can further include parameters for the compiler 230, such as the input code 242 to compile and configure options for the compilation process. Once the compiler 230 is activated, the processor 202 can load the instructions for the compiler 230 into the processor memory 204, and can execute the instructions.

In the example of FIG. 2, the compiler 230 includes a first stage 232, a second stage 236, and a third stage 240, which each perform different operations to produce compiled code 244. In other examples, the compiler 230 can combine the operations of the first stage 232, second stage 236, and/or third stage 240 into fewer stages, or can divide the operations of one of the stages into multiple stages.

The first stage 232 can receive and process input code 242. The input code 242 can describe a program in a high-level programming language, such as Java, C++, or Tensorflow, among many other examples. The input code 242 can describe, for example, steps to perform image recognition, speech recognition, machine translation, or other operations. The input code 242 can be obtained, for example, from the storage device 206. Alternatively, though not illustrated here, the input code 242 may be located in the processor memory 204 or can be obtained from a network location, using the network interface 210. Processing of the input code 242 can include sorting the operations described in the input code 242 into layers, where the outputs of one layer provide the inputs to a next layer. Processing can also include identifying steps to be performed by the processor 202, rather than by the acceleration engine 212. For example, the processor 202, through the execution of a driver 222, may need to perform steps such as configuring Direct Memory Access (DMA) descriptors for moving data into or out of the acceleration engine 212, among other examples.

The output 234 of the first stage 232 can be organized, for example, in the layers, nodes, and connections between nodes of a neural network. The second stage 236 can perform intermediate processing on this output 234. For example, the operations performed in any one layer, or at any one node in a layer, may be too many for the acceleration engine 212 to perform at the same time. The acceleration engine 212 may, for example, have a limited amount of local storage space for the data needed for a computation, or the computations may be more than the acceleration engine 212 can perform at one time. In this example, the first stage 232 can break the operations of the layer or node down into smaller operations, which can fit into the acceleration engine's local memory and/or can fit into the computing capacity of the acceleration engine 212. Processing of the output 234 of the first stage 232 can include other steps, such as scheduling, or determining the order in which the acceleration engine 212 and/or processor 202 will perform operations, among other examples.

In various examples, the output 238 of the second stage 236 includes the various steps to be performed by components of the acceleration engine 212, in the order that the steps are to be performed. The output 238 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 240 can operate on the output 238 of the second stage 236, and perform various steps before producing the instructions that are to be executed by the acceleration engine 212. These steps can include, for example, removing redundant dependencies, resolving or handling dependencies between nodes by inserting synchronization instructions into the code, identifying possible optimizations in memory usage or memory bandwidth usage, and other operations.

The output of the third stage 240 is compiled code 244, which may include machine instructions in binary format. In some examples, the compiled code 244 can be stored in the processor memory 204. Alternatively or additionally, the compiled code 244 can be copied to the storage device 206 or to a network location. As noted above, the acceleration engine 212 may be located at a different host system, in which case the compiled code 244 can be sent over the network interface 210 to the other host system.

In the example of FIG. 2, the host system 200 can execute a driver 222, which can also be referred to as a device driver or runtime driver, that manages the acceleration engine 212. The driver 222 can provide an interface between applications executing on the host system 200 (or on another host system) and the acceleration engine 212. For example, the driver 222 can provide an Application Program Interface (API) that defines functions for feeding input data to the acceleration engine 212 and defining the operation to perform on the input data. In this and other examples, the driver 222 can configure the acceleration engine 212 to perform the operation. For example, the driver 222 can identify a neural network that the acceleration engine 212 is to execute, as well as the location in the processor memory 204 or on the storage device 206 where the compiled code 244 for the neural network is located. The driver 222 can further load into the acceleration engine 212 or cause the acceleration engine 212 to load the compiled code 244, can load or cause the acceleration engine 212 to load the input data on which the neural network is to operate, and/or can cause the acceleration engine 212 to begin executing on the input data. Once the acceleration engine 212 has finished, the acceleration engine 212 can notify the driver 222, and the driver 222 can deliver a result back to the application that requested the result.

Figure 3:
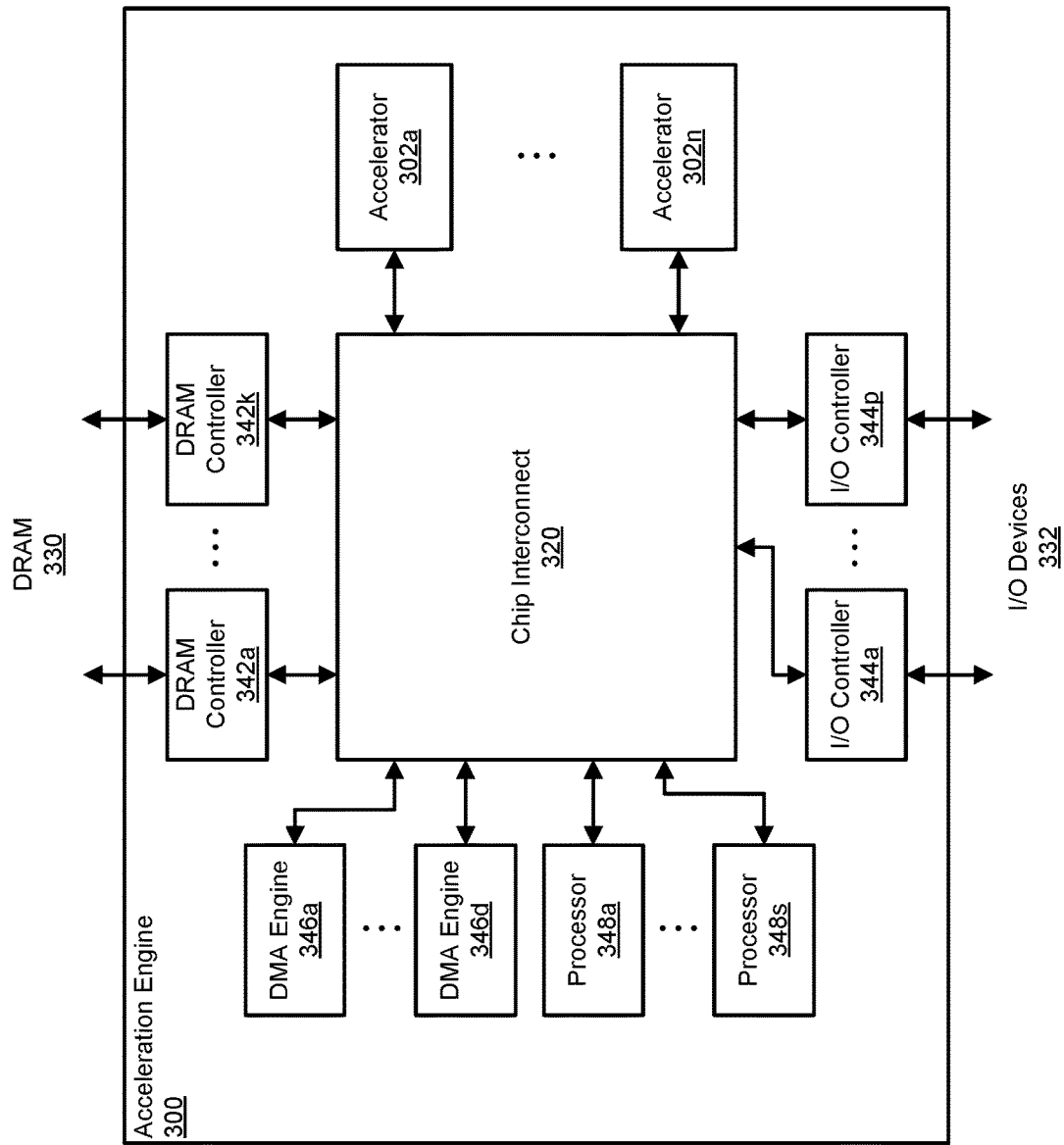
FIG. 3 includes a block diagram that illustrates an example of an acceleration engine.

FIG. 3 includes a block diagram that illustrates an example of an acceleration engine 300. The acceleration engine 300 is an example of an integrated circuit that can include one or more accelerators 302a-302n that may be similar to the accelerator illustrated in FIG. 4.

In the example of FIG. 3, the acceleration engine 300 includes multiple accelerators 302a-302n, each of which can perform a set of operations. In various examples, the accelerators 302a-302n for particular types of operations, so that the accelerators 302a-302n can perform the operations much faster than when similar operations are performed by a general purpose processor. In various examples, to perform a set of operations, input data on which the operations are to be performed must first be moved into the accelerators 302a-302n. Additionally, in some cases, program code is also moved into the accelerators 302a-302n, which programs the operations that the accelerators 302a-302n will perform on the data. In the illustrated example, the acceleration engine 300 includes n accelerators 302a-302n. Examples of accelerators that can be included in the acceleration engine 300 include graphics accelerators, floating point accelerators, neural network accelerators, and others. In various examples, the accelerators 302a-302n can each be the same (e.g., each of the is a graphics accelerator) or can be different (e.g., the accelerators 302a-302n include a graphics accelerator, a floating point accelerator, and neural network accelerator).

The example acceleration engine 300 further includes DRAM controllers 342a-342k for communicating with an external memory. The external memory is implemented, in this example, using DRAM 330. In the illustrated example, the acceleration engine 300 includes k DRAM controllers 342a-342k, each of which may be able to communicate with an independent set of banks of DRAM. In other examples, other types of RAM technology can be used for the external memory. The DRAM controllers 342a-342k can also be referred to as memory controllers.

In various examples, input data and/or program code for the accelerators 302a-302n can be stored in the DRAM 330. Different programs can cause the accelerators 302a-302n to perform different operations. For example, when one of the accelerators is a neural network accelerator, one program can configure the neural network accelerator to perform speech recognition while another program can configure the neural network accelerator to perform image recognition. In various examples, different accelerators 302a-302n can be programmed with different programs, so that each performs a different set of operations. In various examples, the processors 348a-348s can manage moving of program code from the DRAM 330 to the accelerators 302a-302n.

The example acceleration engine 300 further includes I/O controllers 344a-344p for communicating with I/O devices 332 in the system. The acceleration engine 300 can communicate with I/O devices over, for example, a processor bus. In some examples, the processor bus can be implemented using Peripheral Component Interconnect (PCI) and/or a variation of the PCI bus protocol. The processor bus can connect the acceleration engine 300 to I/O devices such as, for example, input and output devices, memory controllers, storage devices, and/or network interface cards, among other things. In some examples, the I/O controllers 344-344p can enable the acceleration engine 300 to act as an I/O device for a host processor. For example, the acceleration engine 300 can be the recipient of input data from the host processor, and a command indicating an operation to be performed on the input data (e.g., a particular computation or analysis). In the illustrated example, the acceleration engine 300 includes p I/O controllers 344a-344p, each of which may include a separate root complex and may communicate with a separate set of I/O devices 332. In other examples, other standardized bus protocols, such as Ultra Path Interconnect (UPI) can be used for the host bus. In other examples, a proprietary bus protocol can be used.

Movement of data in the acceleration engine 300 can be managed by one or more processors 348a-348s, which can also be referred to as data management processors. In the example of FIG. 3, the acceleration engine 300 includes s processors 348a-348s incorporated into (e.g., on the same silicon die) the device. In other examples, the processors 348a-348s can be external to the acceleration engine 300 (e.g., on a different die and/or in a different package). In some examples, the processors 348a-348s can manage the movement of data from I/O devices 332 to the accelerators 302a-302n or the DRAM 330. For example, input data may be located at an I/O device 332 or in processor memory, and the processors 348a-348s can move the input from the I/O device 332 or processor memory into an accelerator or into DRAM 330. As another example, program code for the accelerators 302a-302n may be located on an I/O device 332 or in processor memory.

The example acceleration engine 300 further includes DMA engines 346a-346d that can move data between the accelerators 302a-302n, DRAM controllers 342a-342k, and I/O controllers 344a-344p. In the illustrated example, the acceleration engine 300 includes d DMA engines 346a-346d. In some implementations, the DMA engines 346a-346d can be assigned to specific tasks, such as moving data from the DRAM controllers 342a-342d to the accelerators 302a-302n, or moving data between the I/O controllers 344a-344p and the accelerators 302a-302n. These tasks can be assigned, for example, by enqueueing descriptors with the DMA engines 346a-346d, where a descriptor identifies an address for a block of data and an operation (e.g., a read or a write) to perform. A descriptor, for example, can direct a DMA engine to instruct a DMA controller to read a block of data from DRAM 330. A descriptor can, as a further example, instruct the DMA engine to write data, read by the DMA controller, to an accelerator. Further descriptors can be used to move data from an accelerator to DRAM 330.

In various examples, each of the processors 348a-348s can be responsible for managing the data movement for a different accelerator. In some examples, a processor may manage the data movement for more than one accelerator. Similarly, in various examples, each of the processors 348a-348s can be assigned to one or more DMA engines 346a-346d. In these and other examples, associations between processors 348a-348s, accelerators 302a-302n, and DMA engines 346a-346d is determined by program code being executed by each respective processor.

In the example acceleration engine 300, the various components can communicate over a chip interconnect 320. The chip interconnect 320 primarily includes wiring for routing data between the components of the acceleration engine 300. In some cases, the chip interconnect 320 can include a minimal amount of logic, such as multiplexors to control the direction of data, flip-flops for handling clock domain crossings, and timing logic.

Figure 4:
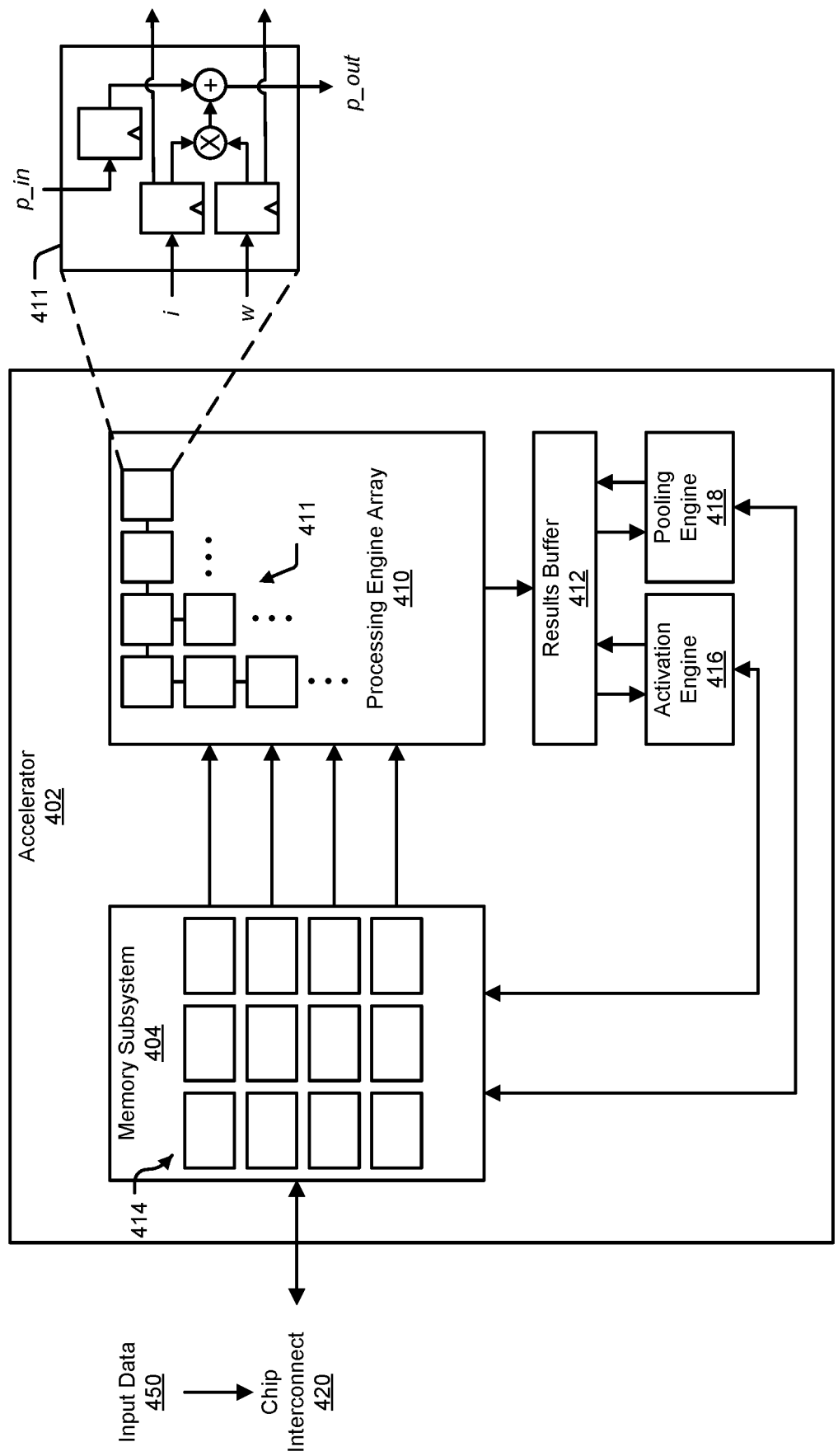
FIG. 4 includes a block diagram illustrating an example of an accelerator.

FIG. 4 includes a block diagram illustrating an example of an accelerator 402. In various examples, the accelerator 402, for a set of input data (e.g., input data 450), can execute computations using a processing engine array 410, an activation engine 416, and/or a pooling engine 418. In some examples, the example accelerator 402 may be an integrated circuit component of a processor, such as a neural network processor. The processor may have other integrated circuit components, including additional accelerators.

In various implementations, the memory subsystem 404 can include multiple memory banks 414. In these implementations, each memory bank 414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the accelerator 402. For example, values can be simultaneously read and provided to each row of the processing engine array 410, so that the entire processing engine array 410 can be in use in one clock cycle. As another example, the memory banks 414 can be read at the same time that results computed by the processing engine array 410 are written to the memory subsystem 404. In contrast, a single memory may be able to service only one read or write at a time. With a single memory, multiple clock cycles can be required, for example, to read input data for each row of the processing engine array 410 before the processing engine array 410 can be started.

In various implementations, the memory subsystem 404 can be configured to simultaneously service multiple clients, including the processing engine array 410, the activation engine 416, the pooling engine 418, and any external clients that access the memory subsystem 404 over a communication fabric 420. In some implementations, being able to service multiple clients can mean that the memory subsystem 404 has at least as many memory banks as there are clients. In some cases, each row of the processing engine array 410 can count as a separate client. In some cases, each column of the processing engine array 410 can output a result, such that each column can count as a separate write client. In some cases, output from the processing engine array 410 can be written into the memory banks 414 that can then subsequently provide input data for the processing engine array 410. As another example, the activation engine 416 and the pooling engine 418 can include multiple execution channels, each of which can be separate memory clients. The memory banks 414 can be implemented, for example, using static random access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the processing engine array 410, with one memory bank servicing each row. As another example, a set of memory banks can be hard wired to receive values from columns of the processing engine array 410, with one memory bank receiving data for each column.

The processing engine array 410 is the computation matrix of the example accelerator 402. The processing engine array 410 can, for example, execute parallel integration, convolution, correlation, and/or matrix multiplication, among other things. The processing engine array 410 includes multiple processing engines 411, arranged in rows and columns, such that results output by one processing engine 411 can be input directly into another processing engine 411. Processing engines 411 that are not on the outside edges of the processing engine array 410 thus can receive data to operate on from other processing engines 411, rather than from the memory subsystem 404.

In various examples, the processing engine array 410 uses systolic execution, in which data arrives at each processing engine 411 from different directions or the same directions at regular intervals. In some examples, input data can flow into the processing engine array 410 from the left and weight values can be loaded at the top. In some examples weights and input data can flow from the left and partial sums can flow from top to bottom. In these and other examples, a multiply-and-accumulate operation moves through the processing engine array 410 as a diagonal wave front, with data moving to the right and down across the array. Control signals can be input at the left at the same time as data or weights, and can flow across and down along with the computation.

In various implementations, the number of columns in the processing engine array 410 determines the computational capacity of the processing engine array 410, and the number of rows determines the required memory bandwidth for achieving maximum utilization of the processing engine array 410. The processing engine array 410 can have, for example, 64 columns and 64 rows, or some other number of columns and rows.

An example of a processing engine 411 is illustrated in FIG. 4 in an inset diagram. As illustrated by this example, a processing engine 411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 411.

In the illustrated example, an input from above can include a partial sum, pin, provided either from another processing engine 411 or from a previous round of computation by the processing engine array 410. When starting a computation for a new set of input data, the top row of the processing engine array 410 can receive a fixed value for p_in, such as zero. As illustrated by this example, i and w are multiplied together and the result is summed with p_in to produce a new partial sum, p_out, which can be input into another processing engine 411. Various other implementations of the processing engine 411 are possible.

Outputs from the last row in the processing engine array 410 can be temporarily stored in the results buffer 412. The results can be intermediate results, which can be written to the memory banks 414 to be provided to the processing engine array 410 for additional computation. Alternatively, the results can be final results, which, once written to the memory banks 414 can be read from the memory subsystem 404 over the communication fabric 420, to be output by the system.

In some implementations, the accelerator 402 includes an activation engine 416. In these implementations, the activation engine 416 can combine the results from the processing engine array 410 into one or more output activations. For example, for a convolutional neural network, convolutions from multiple channels can be summed to produce an output activation for a single channel. In other examples, accumulating results from one or more columns in the processing engine array 410 may be needed to produce an output activation for a single node in the neural network. In some examples, activation engine 416 can be bypassed.

In various examples, the activation engine 416 can include multiple separate execution channels. In these examples, the execution channels can correspond to the columns of the processing engine array 410, and can perform an operation on the outputs of a column, the result of which can be stored in the memory subsystem 404. In these examples, the activation engine 416 may be able to perform between 1 and n parallel computations, where n is equal to the number of columns in the processing engine array 410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 402 can include a pooling engine 418. Pooling is the combining of outputs of the columns of the processing engine array 410. Combining can include for example, computing a maximum value, a minimum value, an average value, a median value, a summation, a multiplication, or another logical or mathematical combination. In various examples, the pooling engine 418 can include multiple execution channels that can operating on values from corresponding columns of the processing engine array 410. In these examples, the pooling engine 418 may be able to perform between 1 and n parallel computations, where n is equal to the number of columns in the processing engine array 410. In various examples, execution channels of the pooling engine 418 can operate in parallel and/or simultaneously. In some examples, the pooling engine 418 can be bypassed.

Herein, the activation engine 416 and the pooling engine 418 may be referred to collectively as execution engines. The processing engine array 410 is another example of an execution engine. Another example of an execution engine is a Direct Memory Access (DMA) engine, which may be located outside the accelerator 402.

Input data 450 can arrive over the communication fabric 420. The communication fabric 420 can connect the accelerator 402 to other components of a processor, such as a DMA engine that can obtain input data 450 from an Input/Output (I/O) device, a storage drive, or a network interface. The input data 450 can be, for example one-dimensional data, such as a character string or numerical sequence, or two-dimensional data, such as an array of pixel values for an image or frequency and amplitude values over time for an audio signal. In some examples, the input data 450 can be three-dimensional, as may be the case with, for example, the situational information used by a self-driving car or virtual reality data. In some implementations, the memory subsystem 404 can include a separate buffer for the input data 450.

In some implementations, the input data 450 can be stored in the memory banks 414 when the accelerator 402 receives the input data 450.

In some examples, the accelerator 402 can implement a neural network processing engine. In these examples, the accelerator 402, for a set of input data 450, can execute a neural network to perform a task for which the neural network was trained. Executing a neural network on a set of input data can be referred to as inference or performing inference.

The weights for the neural network can be stored in the memory subsystem 404, along with input data 450 on which the neural network will operate. The neural network can also include instructions, which can program the processing engine array 410 to perform various computations on the weights and the input data. The instructions can also be stored in the memory subsystem 404, in the memory banks 414 or in a separate instruction buffer. The processing engine array 410 can output intermediate results, which represent the outputs of individual layers of the neural network. In some cases, the activation engine 416 and/or pooling engine 418 may be enabled for computations called for by certain layers of the neural network. The accelerator 402 can store the intermediate results in the memory subsystem 404 for inputting into the processing engine array 410 to compute results for the next layer of the neural network. The processing engine array 410 can further output final results from a last layer of the neural network. The final results can be stored in the memory subsystem 404 and then be copied out to host processor memory or to another location.

Figure 5:
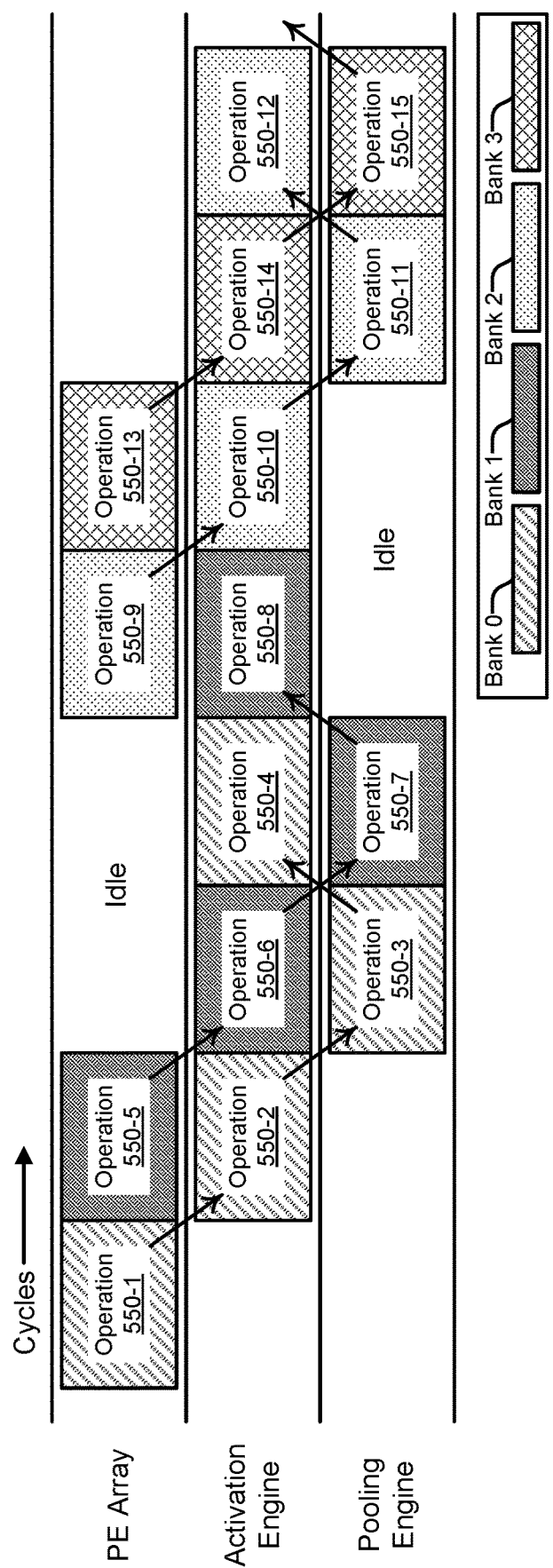
FIG. 5 illustrates an example of inefficient pipelining across multiple execution engines.

FIG. 5 illustrates an example of inefficient pipelining across multiple execution engines. Each of the three horizontal lanes correspond to a different execution engine described in reference to FIG. 4, such as the processing engine array 410 ("PE Array"), the activation engine 416 ("Activation Engine"), and the pooling engine 418 ("Pooling Engine"). Each execution engine performs various operations 550 and writes the output data to one of four banks as indicated by the patterns illustrated on each of the operations 550. Banks 0-3 may correspond to different banks of the results buffer 412 described in reference to FIG. 4.

In the illustrated example, the PE array may perform the operation 550-1 and may write the output data to Bank 0. Next, the PE array may perform the operation 550-5 and write the output data to Bank 1. Concurrently, the activation engine may perform the operation 550-2 on the output data from the operation 550-1 and write the output data to Bank 0. In some instances, the PE array may overwrite the output data of the operation 550-1 when writing the output data of the operation 550-2 to Bank 0. Accordingly, operations that write or read to the same memory bank can only be performed after previous operations have completed.

In the illustrated example, the pipelining is inefficient because the sequence of operations that write to each bank is as follows: (1) PE array, (2) activation engine, (3) pooling engine, and (4) activation engine. Since activation engine is used twice in each sequence, the different sequences cannot be placed side-by-side in an efficient manner, resulting in the PE array and the pooling engine being idle at different times.

Figure 6B:
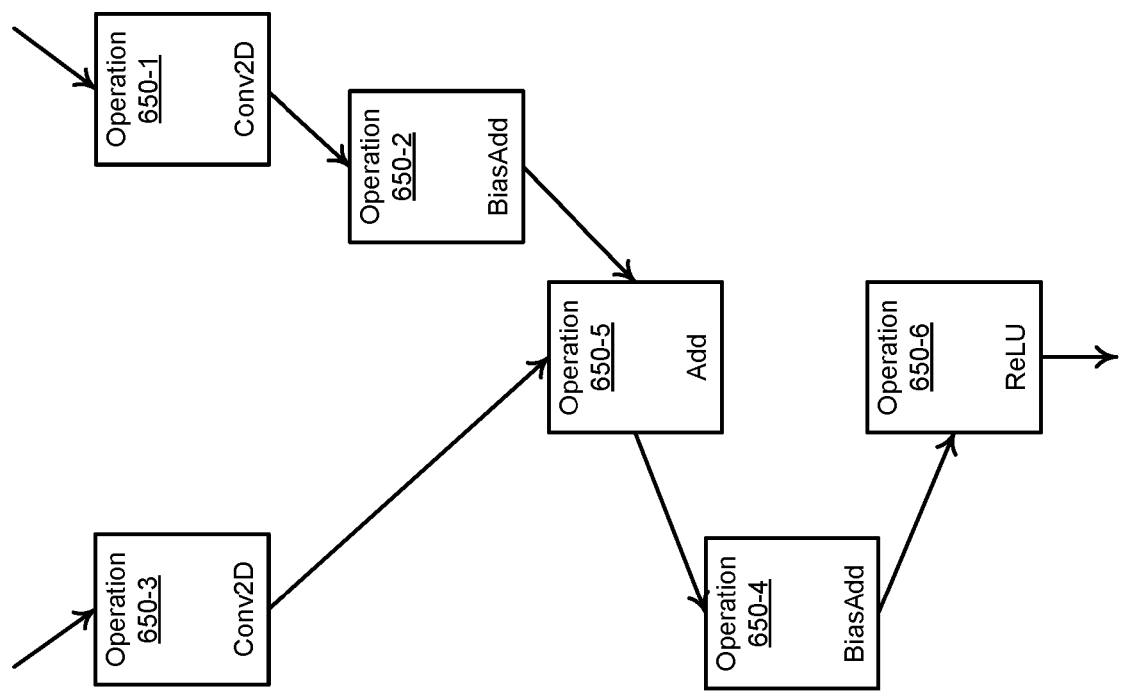
FIGS. 6A and 6B illustrate an example of operation reordering to improve runtime efficiency.
Figure 6A:
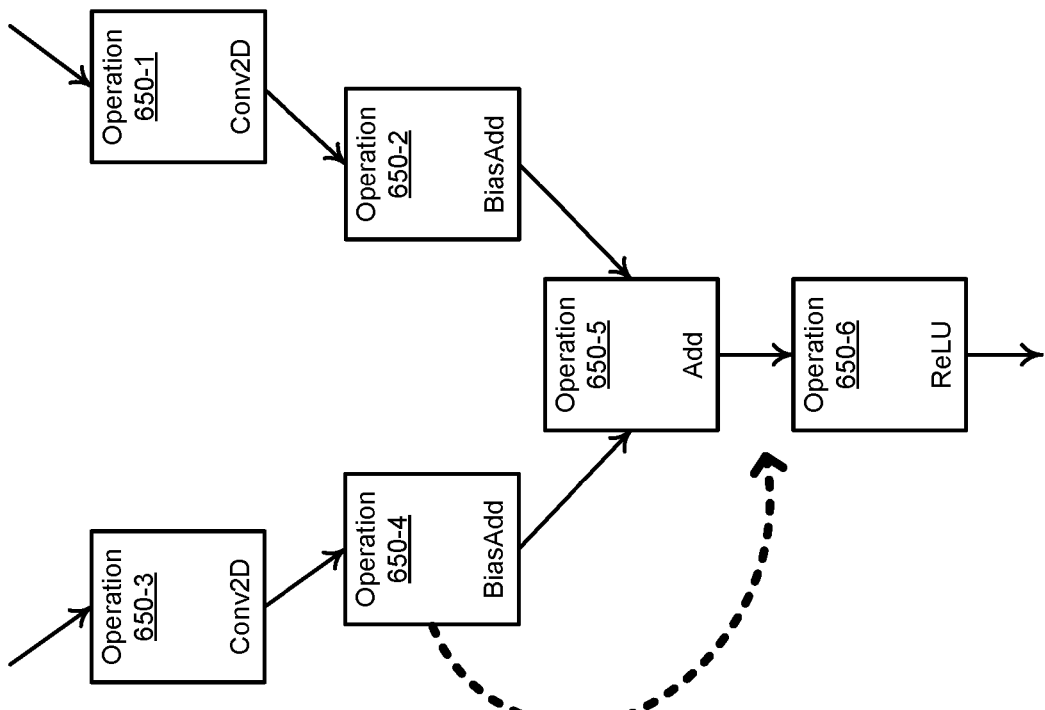

FIGS. 6A and 6B illustrate an example of operation reordering to improve runtime efficiency. FIG. 6A illustrates a set of operations 650 that may be found in neural network architecture, such as ResNet 50, in which two branches are joined together with an add operation 650-5, which is performed by the pooling engine. On the left branch preceding the operation 650-5 is a convolution operation 650-3 performed by the PE array and a bias add operation 650-4 performed by the activation engine. After the add operation 650-5 is a ReLU operation also performed by the activation engine.

The compiler may identify that the sequence formed by the operations 650-3, 650-4, 650-5, and 650-6 constitutes a runtime inefficiency. In response, the compiler may move the operation 650-4 to a new position after the operation 650-5, as indicated by the dashed line. FIG. 6B illustrates the resulting order of the operations. After convolution is performed by the PE array at the operation 650-3, the add operation is performed by the pooling engine at the operation 650-5 based on the output data generated by the operation 650-3 as well as the output data generated by the bias add performed at the operation 650-2. Next, the bias add operation is performed by the activation engine at the operation 650-4 and the ReLU operation is also performed by the activation engine at the operation 650-6, allowing the activation engine to only be visited a single time immediately after the operation 650-5. In some examples, the operations 650-4 and 650-6 are combined into a single operation. For example, if both the operations 650-4 and 650-6 perform a similar operation, such as addition between an input value and a stored constant, the two stored constants may be added together during compilation and a single addition with an input value may be performed during runtime. As another example, if both the operations 650-4 and 650-6 perform multiplication between an input value and a stored constant, the two stored constants may be multiplied together during compilation and a single multiplication may be performed during runtime.

Figure 7:
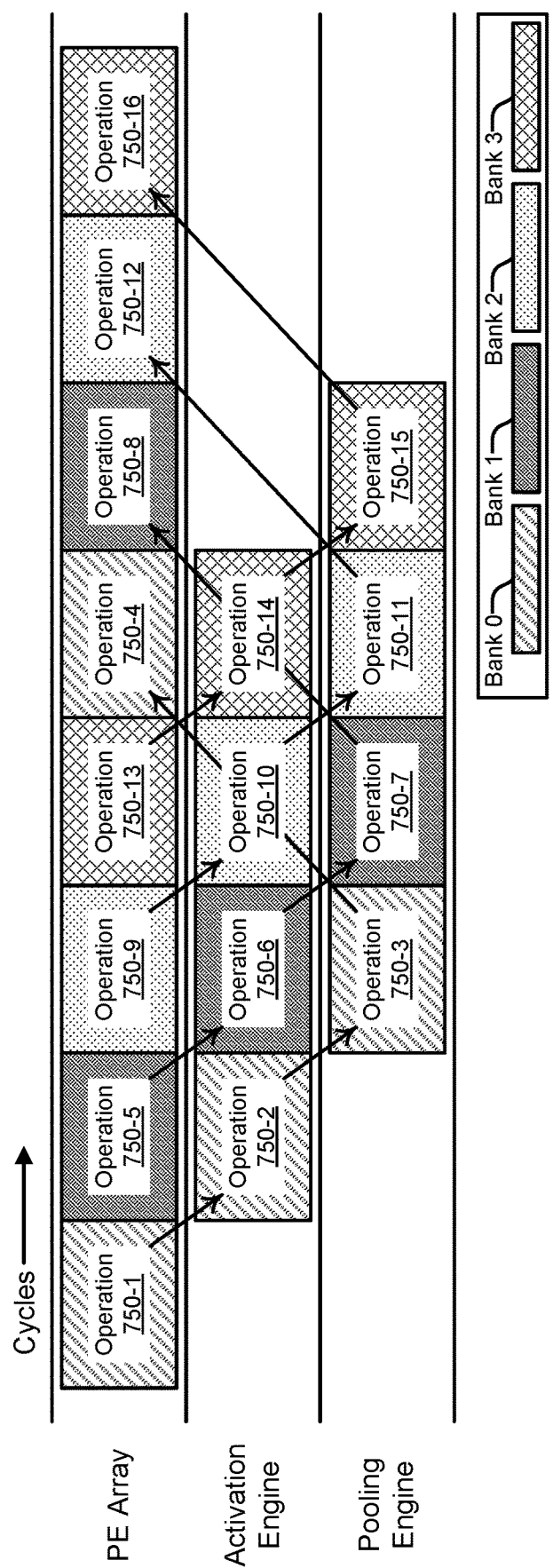
FIG. 7 illustrates an example of efficient pipelining across multiple execution engines.

FIG. 7 illustrates an example of efficient pipelining across multiple execution engines. The example illustrated in FIG. 7 may correspond to the reordered operations described in reference to FIG. 6B or to a different set of operations. Each of the three horizontal lanes correspond to a different execution engine, as was described in reference to FIG. 5.

In the illustrated example, the PE array may perform the operation 750-1 and may write the output data to Bank 0. Next, the PE array may perform the operation 750-5 and write the output data to Bank 1. Concurrently, the activation engine may perform the operation 750-2 on the output data from the operation 750-1 and write the output data to Bank 0. Next, the PE array may perform the operation 750-9 and write the output data to Bank 2. Concurrently, the activation engine may perform the operation 750-6 on the output data from the operation 750-5 and write the output data to Bank 1. Concurrently, the pooling engine may perform the operation 750-3 on the output data from the operation 750-2 and write the output data to Bank 0.

In this manner, the pipelining is efficient because the sequence of operations that write to each bank is as follows: (1) PE array, (2) activation engine, (3) pooling engine, followed by (4) PE array. This allows the different sequences of operations to be arranged in a side-by-side configuration with no execution engines sitting idle. After the operation 750-3 has completed, Bank 0 becomes available and a new sequence of operations may commence at the PE array with the operation 750-4. Although not illustrated in FIG. 7, each of the operations 750-4, 750-8, 750-12, and 750-16 may be followed by operations performed by the activation engine and then by operations performed by the pooling engine.

Figure 8:
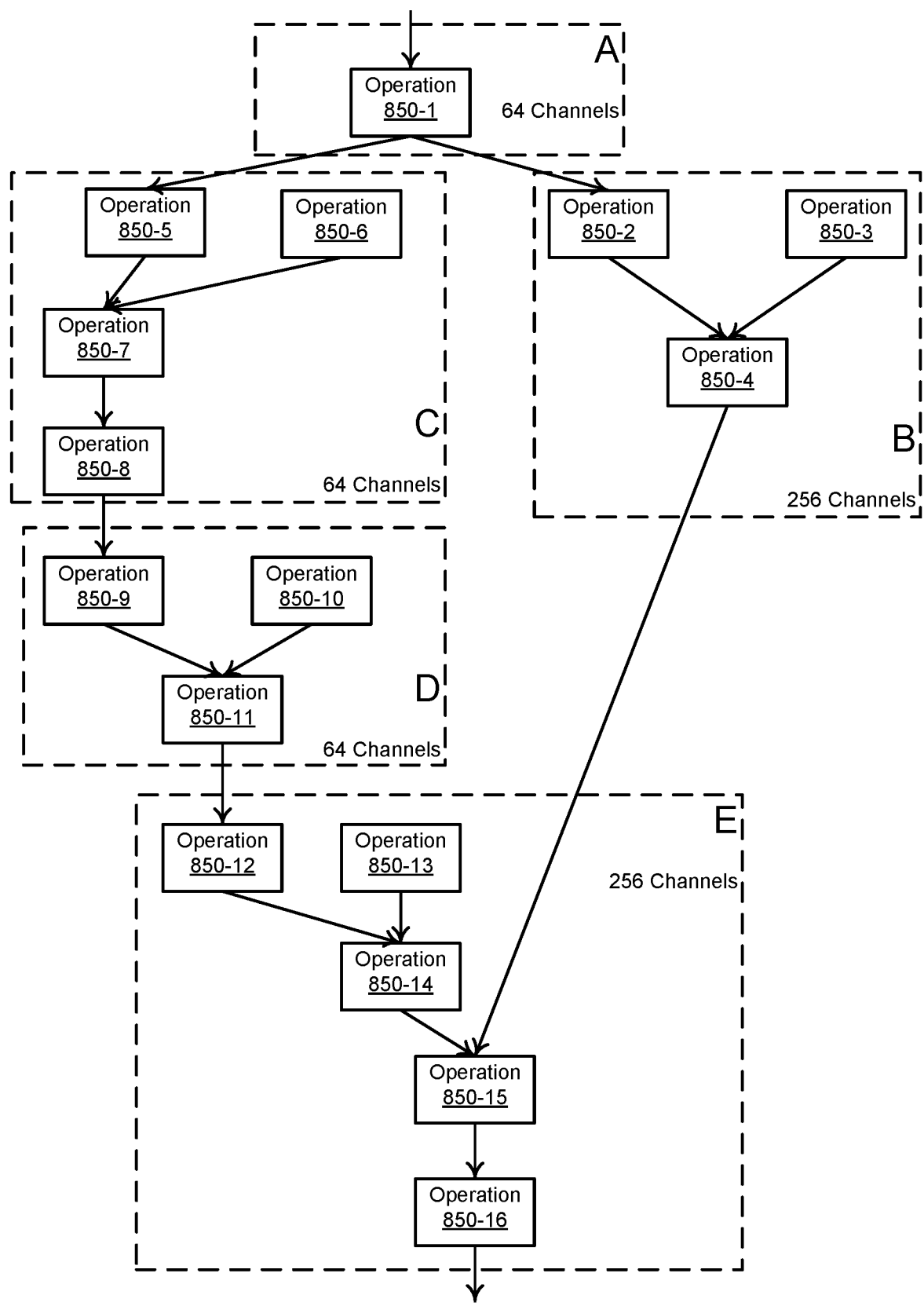
FIG. 8 illustrates an example of various operations and their associated memory usage.

FIG. 8 illustrates an example of various operations 850 and their associated memory usage. The operations 850 are grouped into different blocks (i.e., Blocks A-E) based on a similar memory usage amongst operations of a single block. Block A includes a single operation 850-1 that writes output data to 64 channels. Block B includes the operations 850-2 through 850-4 that write to 256 channels. Block C includes the operations 850-5 through 850-8 that write to 64 channels. Block D includes the operations 850-9 through 850-11 that write to 64 channels. Block E includes the operations 850-12 through 850-16 that write to 256 channels.

The operations 850 may be grouped into blocks by the compiler based on their memory usage. In some examples, the compiler first determines the memory usage of each of the operations 850. Next, the compiler may group operations together that are adjacent and have the same memory usage. In some examples, the compiler may group operations that have different but similar memory usage (e.g., within 50% of each other). In some examples, each block may be associated with a maximum memory usage of each operation inside the block. For example, the operations 850-2 through 850-4 of Block B may each write to 256 channels, only two of the operations may write to 256 channels, or only one of the operations may write to 256 channels.

In some examples, the operations 850 are grouped into blocks based on a collective memory usage. For example, the operation 850-2 may write to 128 channels and the operation 850-3 may write to 128 different channels. In some examples, the operations 850 are grouped into blocks based on the memory usage of the last operation in the block. For example, the operation 850-4 may write to 256 channels even through the operations 850-2 and 850-3 write to fewer or more channels.

The compiler may reorder the operations 850 by reordering Blocks A-E based on the memory usage of each block. The compiler may identify a set of diverging branches, such as Block A diverging into Blocks B and C, and may determine a memory usage associated with each branch. In some examples, the compiler may identify the performance of a branch containing a higher memory usage block (e.g., Block B) prior to a branch containing a lower memory usage block (e.g., Blocks C and D) as a runtime inefficiency. The compiler may resolve or reduce the runtime inefficiency by reordering the blocks such that the branch containing the higher memory usage block is performed after the branch containing the lower memory usage block.

Figure 9A:
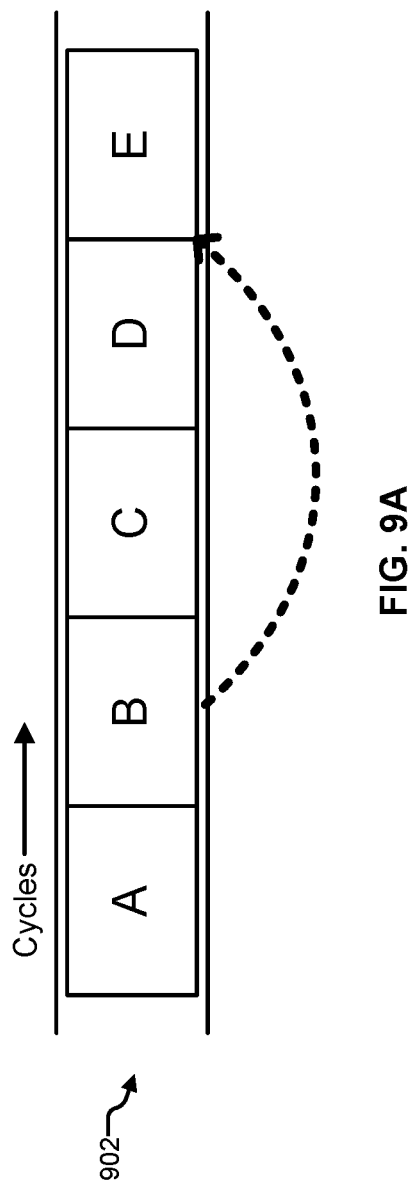
FIGS. 9A and 9B illustrate an example of reordering blocks of operations to improve memory usage.
Figure 9B:
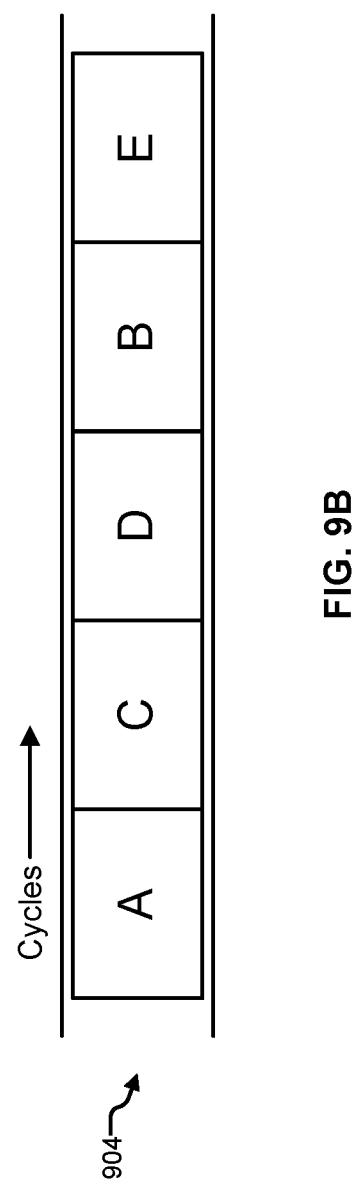

FIGS. 9A and 9B illustrate an example of reordering blocks of operations to improve memory usage of the operations 850 described in reference to FIG. 8. FIG. 9A illustrates an order of performance 902 prior to reordering. As indicated by the dashed line, Block B can be moved after Blocks C and D such that the operations contained in Blocks C and D are performed prior to the operations contained in Block B. FIG. 9B illustrates an order of performance 904 after reordering.

Figure 10A:
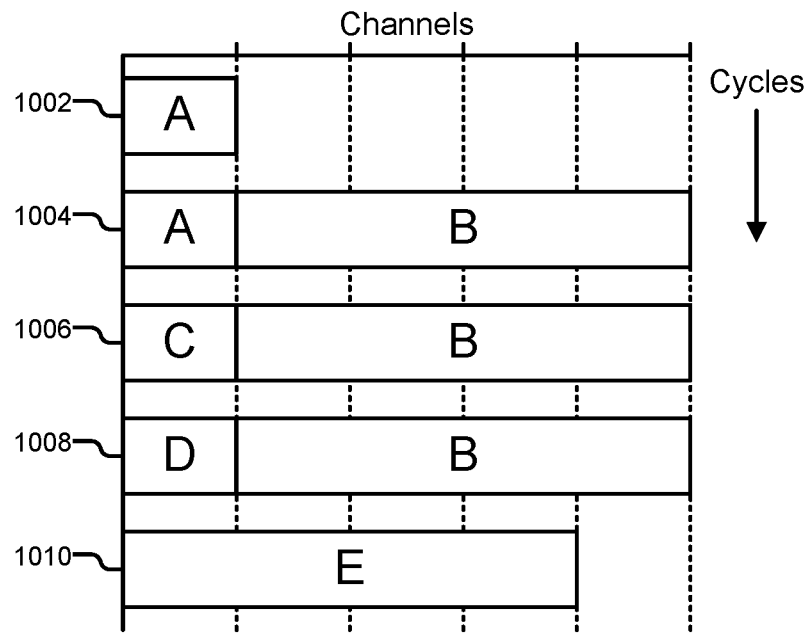
FIGS. 10A and 10B illustrate an example of improved memory usage resulting from reordering operations.
Figure 10B:
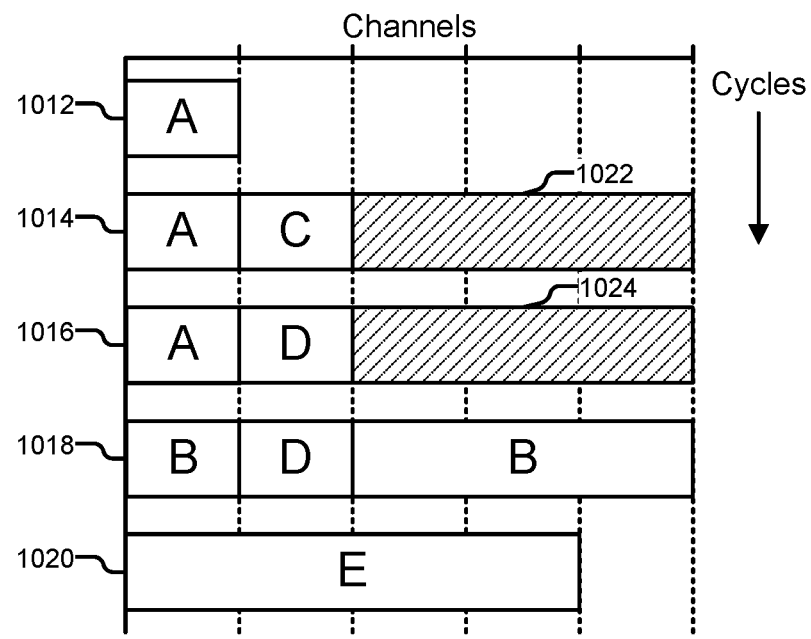

FIGS. 10A and 10B illustrate an example of improved memory usage resulting from reordering operations as described in reference to FIGS. 9A and 9B. FIG. 10A illustrates the memory usage of performing Blocks A-E without reordering. At 1002, the operations of Block A write to 64 channels of a memory device. At 1004, the operations of Block B write to 256 channels without overwriting the output of Block A, since Block C requires the availability of the output of Block A. At 1006, the operations of Block C write to 64 channels, overwriting the output of Block A. At 1008, the operations of Block D write to 64 channels, overwriting the output of Block C. At 1010, the operations of Block E write to 256 channels, overwriting the output of Block D and partially overwriting the output of Block B.

FIG. 10B illustrates the memory usage of performing Blocks A-E after reordering. At 1012, the operations of Block A write to 64 channels of a memory device. At 1014, the operations of Block C write to 64 channels without overwriting the output of Block A, since Block B requires the availability of the output of Block A. Performing Block C prior to Block B results in memory savings 1022. At 1016, the operations of Block D write to 64 channels, overwriting the output of Block C. Performing Block D prior to Block B results in memory savings 1024. At 1018, the operations of Block B write to 256 channels, overwriting the output of Block A. At 1020, the operations of Block E write to 256 channels, overwriting the output of Block D and partially overwriting the output of Block B.

Figure 11:
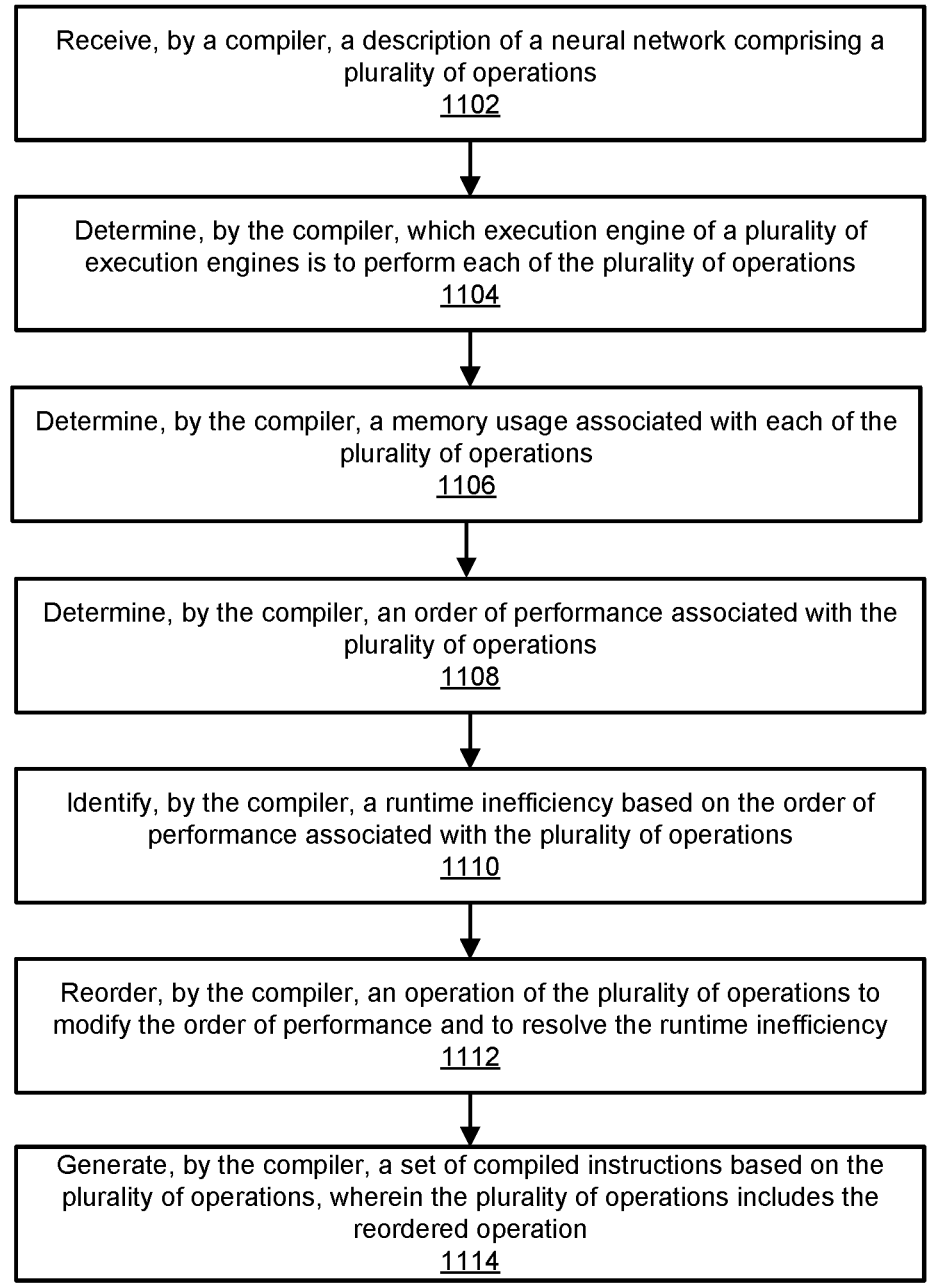
FIG. 11 illustrates an example method of reordering operations of a neural network.

FIG. 11 illustrates a method 1100 of reordering operations of a neural network. The method 1100 may be applied to a number of applications, and may further be performed on any set of operations having a predefined order, not only those derived from neural networks. One or more steps of the method 1100 may be performed in an order different than the illustrated example, and one or more steps of the method 110 may be omitted during performance of the method 1100.

At step 1102, a compiler receives a plurality of operations. In some examples, the compiler may receive the plurality of operations as part of a description of a neural network. The plurality of operations may correspond to one or more nodes and/or one or more layers of the neural network. The compiler may receive the plurality of operations via a storage device or by accessing a portion of the processor memory where source code for the plurality of operations is stored.

At step 1104, the compiler determines which execution engine of a plurality of execution engines is to perform each of the plurality of operations. The plurality of execution engines may include, for example, a processing engine (PE) or PE array, an activation engine, a pooling engine, etc. In some examples, the compiler previously assigns an execution engine to each operation and, at step 1104, reads data indicating which execution engine was previously assigned. In some examples, the execution engine that performs each operation is determined by the compiler based on the type of operation (e.g., convolution, bias add, ReLU, etc.). In some examples, the compiler reads data associated with each of the operations to determine which execution engine is to perform the operation.

At step 1106, the compiler determines a memory usage associated with each of the plurality of operations. The memory usage may be the amount of memory occupied by the output of the operation. The memory usage may be the maximum amount of memory or average amount of memory, among other possibilities. In some examples, the compiler determines the memory usage for an operation based on the type of operation (e.g., convolution, bias add, ReLU, etc.). In some examples, the compiler reads data associated with each of the operations to determine the memory usage associated with the operation. In some examples, the compiler determines a memory usage associated with groups (e.g., blocks) of operations.

In some examples, the compiler determines a hardware usage for each of the plurality of operations. This may include, in various examples, performing step 1104, performing step 1106, or performing both steps 1104 and 1106.

At step 1108, the compiler determines an order of performance associated with the plurality of operations. The order of performance may indicate the current order (prior to any reordering resulting from the performance of the method 1100) that the operations are to be performed. The compiler may determine the order of performance of the plurality of operations by determining the order the operations are listed in the source code, by parsing the neural network architecture, by reading data associated with each of the operations, among other possibilities.

At step 1110, the compiler identifies a runtime inefficiency based on the order of performance associated with the plurality of operations and/or the hardware usage associated with the plurality of operations. For example, the runtime inefficiency may be based on which execution engine of the plurality of execution engines is to perform each of the plurality of operations. In some examples, the runtime inefficiency may be based on the memory usage associated with each of the plurality of operations.

In some examples, identifying the runtime inefficiency includes identifying various predetermined patterns associated with the plurality of operations and the plurality of execution engines. For example, identifying the runtime inefficiency may include identifying a first operation (e.g., operation 550-2) performed by a first execution engine (e.g., activation engine), followed by a second operation (e.g., operation 550-3) performed by a second execution engine (e.g., pooling engine), followed by a third operation (e.g., operation 550-4) performed by the first execution engine. The second operation may be performed on the output of the first operation and the third operation may be performed on the output of the second operation. The predetermined pattern may further include a fourth operation (e.g., operation 550-1) performed by a third execution engine (e.g., PE array). The output of the fourth operation may be used as the input to the first operation. Such a pattern may be deemed as inefficient because multiple instances of the pattern cannot be performed sequentially without certain execution engines being idle at various times, as is illustrated in FIG. 5.

In some examples, identifying the runtime inefficiency includes identifying various memory usage patterns associated with the plurality of operations. For example, the compiler may group the plurality of operations into blocks based on a similar memory usage amongst operations of a single block. The compiler may identify a set of diverging branches in the neural network. The compiler may identify a runtime inefficiency where a branch containing a higher memory usage block is performed prior to a branch containing a lower memory usage block.

At step 1112, the compiler reorders a particular operation of the plurality of operations to modify the order of performance and to resolve or reduce the runtime inefficiency. In some instances, the compiler queries a database using the runtime inefficiency to determine how to resolve or reduce the runtime inefficiency. Based on the specific runtime inefficiency that was identified, the database may provide an instruction that indicates how the particular operation should be reordered (e.g., how many operations forward or backward the particular operation should be moved). Reordering the particular operation may include modifying which operation precedes the particular operation and/or which operation follows the particular operation. Accordingly, reordering the particular operation changes at least one of the adjacent operations to the particular operation. In some examples, the positions of two operations of the plurality of operations may be swapped. In some examples, an operation may be moved and inserted between two operations that were previously adjacent to each other.

In some examples, where the runtime inefficiency involves an identified pattern in which a particular execution engine is used twice before using another execution engine, the compiler may resolve or reduce the runtime inefficiency by moving the two operations performed by the particular execution engine to be adjacent and, optionally, combining the two operations.

In some examples, where the runtime inefficiency involves a higher memory usage block being performed prior to a lower memory usage block, the compiler may resolve or reduce the runtime inefficiency by reordering the blocks such that the branch containing the higher memory usage block is performed after the branch containing the lower memory usage block.

At step 1114, the compiler generates a set of compiled instructions (e.g., compiled code 244) based on the plurality of operations, including the reordered operation(s). The set of compiled instructions may then be transferred to the execution engines and/or to an acceleration engine (e.g., acceleration engine 212) containing the execution engines.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   receiving, by a compiler, a description of a neural network comprising a plurality of operations;
   identifying a set of diverging branches within the plurality of operations, the set of diverging branches including a first branch and a second branch;
   determining that the first branch is to be performed after the second branch;
   determining a first memory usage associated with the first branch and a second memory usage associated with the second branch;
   determining that the first memory usage is less than the second memory usage; and
   modifying an order of performance of the plurality of operations to cause the first branch to be performed before the second branch.

2. The method of claim 1, further comprising:
   generating machine instructions based on the modified order of performance.

3. The method of claim 1, further comprising:
   grouping the plurality of operations into a set of blocks.

4. The method of claim 3, wherein the first branch includes one or more first blocks from the set of blocks and the second branch includes one or more second blocks from the set of blocks.

5. The method of claim 4, wherein determining the first memory usage associated with the first branch includes determining the first memory usage associated with each of the one or more first blocks, and wherein determining the second memory usage associated with the second branch includes determining the second memory usage associated with each of the one or more second blocks.

6. The method of claim 5, wherein determining that the first memory usage is less than the second memory usage includes determining that the first memory usage associated with each of the one or more first blocks is less than the second memory usage associated with each of the one or more second blocks.

7. The method of claim 1, wherein determining the first memory usage includes determining a first number of channels that are written to by the plurality of operations that are included in the first branch, and wherein determining the second memory usage includes determining a second number of channels that are written to by the plurality of operations that are included in the second branch.

8. The method of claim 7, wherein determining that the first memory usage is less than the second memory usage includes determining that the first number of channels is less than the second number of channels.

9. A non-transitory computer-readable medium comprising instructions that, when executed by a processor, cause the processor to perform operations comprising:
   receiving, by a compiler, a description of a neural network comprising a plurality of operations;
   identifying a set of diverging branches within the plurality of operations, the set of diverging branches including a first branch and a second branch;
   determining that the first branch is to be performed after the second branch;
   determining a first memory usage associated with the first branch and a second memory usage associated with the second branch;
   determining that the first memory usage is less than the second memory usage; and
   modifying an order of performance of the plurality of operations to cause the first branch to be performed before the second branch.

10. The non-transitory computer-readable medium of claim 9, wherein the operations further comprise:
   grouping the plurality of operations into a set of blocks.

11. The non-transitory computer-readable medium of claim 10, wherein the first branch includes one or more first blocks from the set of blocks and the second branch includes one or more second blocks from the set of blocks.

12. The non-transitory computer-readable medium of claim 11, wherein determining the first memory usage associated with the first branch includes determining the first memory usage associated with each of the one or more first blocks, and wherein determining the second memory usage associated with the second branch includes determining the second memory usage associated with each of the one or more second blocks.

13. The non-transitory computer-readable medium of claim 12, wherein determining that the first memory usage is less than the second memory usage includes determining that the first memory usage associated with each of the one or more first blocks is less than the second memory usage associated with each of the one or more second blocks.

14. The non-transitory computer-readable medium of claim 9, wherein determining the first memory usage includes determining a first number of channels that are written to by the plurality of operations that are included in the first branch, and wherein determining the second memory usage includes determining a second number of channels that are written to by the plurality of operations that are included in the second branch.

15. The non-transitory computer-readable medium of claim 14, wherein determining that the first memory usage is less than the second memory usage includes determining that the first number of channels is less than the second number of channels.

16. A system comprising:
   a processor; and
   a non-transitory computer-readable medium comprising instructions that, when executed by the processor, cause the processor to perform operations comprising:
      receiving, by a compiler, a description of a neural network comprising a plurality of operations;
      identifying a set of diverging branches within the plurality of operations, the set of diverging branches including a first branch and a second branch;
      determining that the first branch is to be performed after the second branch;
      determining a first memory usage associated with the first branch and a second memory usage associated with the second branch;
      determining that the first memory usage is less than the second memory usage; and
      modifying an order of performance of the plurality of operations to cause the first branch to be performed before the second branch.

17. The system of claim 16, wherein the operations further comprise:
   grouping the plurality of operations into a set of blocks.

18. The system of claim 17, wherein the first branch includes one or more first blocks from the set of blocks and the second branch includes one or more second blocks from the set of blocks.

19. The system of claim 18, wherein determining the first memory usage associated with the first branch includes determining the first memory usage associated with each of the one or more first blocks, and wherein determining the second memory usage associated with the second branch includes determining the second memory usage associated with each of the one or more second blocks.

20. The system of claim 19, wherein determining that the first memory usage is less than the second memory usage includes determining that the first memory usage associated with each of the one or more first blocks is less than the second memory usage associated with each of the one or more second blocks.

* * * * *